United States Patent [19]
Komatsu

[11] Patent Number: 5,610,732
[45] Date of Patent: Mar. 11, 1997

[54] IMAGE PROCESSING APPARATUS HAVING UNEVENLY GAMUT DIVIDING COLOR-CONVERTING FUNCTION

[75] Inventor: Manabu Komatsu, Tokyo, Japan

[73] Assignee: Ricoh Company, Ltd., Tokyo, Japan

[21] Appl. No.: 331,929

[22] Filed: Oct. 31, 1994

[30] Foreign Application Priority Data

Oct. 30, 1993 [JP] Japan ................................. 5-294631

[51] Int. Cl.$^6$ ........................................................ H04N 1/60
[52] U.S. Cl. ........................... 358/525; 358/518; 358/520
[58] Field of Search ........................ 358/515, 518–520, 358/525; 382/167, 300; H04N 1/60

[56] References Cited

U.S. PATENT DOCUMENTS

| | | | |
|---|---|---|---|
| 5,243,414 | 9/1993 | Darlymple et al. | 358/500 |
| 5,309,257 | 5/1994 | Bonino et al. | 358/504 |
| 5,311,332 | 5/1994 | Imao et al. | 358/519 |
| 5,311,334 | 5/1994 | Sugiura | 358/537 |
| 5,313,314 | 5/1994 | Ikegami | 358/518 |
| 5,317,426 | 5/1994 | Hoshino | 358/515 |
| 5,319,473 | 6/1994 | Harrington | 358/501 |
| 5,323,249 | 6/1994 | Liang | 358/518 |
| 5,363,218 | 11/1994 | Hoshino | 358/518 |
| 5,436,739 | 7/1995 | Imao et al. | 358/520 |
| 5,450,216 | 9/1995 | Kasson | 358/518 |
| 5,463,480 | 10/1995 | MacDonald et al. | 358/520 |

OTHER PUBLICATIONS

Japanese book, Image Engineering, written by Toshi Minami and Osamu Nakamura, published by Corona Publishing Co., Ltd., Tokyo, Japan, edited by Television Society, pp.8–25, '2.2.4 XYZ Color Representing System'.

English article, A Color Correction Method from Standardized Color–Space Signals for Printers, written by Manabu Komatsu, Shogo Ohneda, Hiroaki Suzuki and Hiroki Kubozono of Ricoh Company Ltd., Japan (Oct. 5–III–p7), in Advances in Non–Impact Printing Technologies/Japan Hardcopy '93, pp. 545–548.

Primary Examiner—Kim Vu
Attorney, Agent, or Firm—Lowe, Price, LeBlanc & Becker

[57] ABSTRACT

An uneven dividing unit unevenly divides an input gamut into divisions which have figures similar to one another. An output-value determining unit determines predetermined lattice-point output values relevant to the divisions. A division selecting unit selects a division among the divisions obtained through the uneven dividing unit, the selected division corresponding to given input color-image data. An interpolating unit interpolates final output values for the given input color-image data using the lattice-point output values relevant to the division selected through the division selecting unit. The uneven dividing performed by the uneven dividing unit is that eliminating lattice points, the lattice-point output values of which are not used in the interpolating performed by the interpolating unit.

14 Claims, 8 Drawing Sheets

FIG. 5

| | | | | | | | | | |
|---|---|---|---|---|---|---|---|---|---|
| INPUT GAMUT DIVIDING INFORMATION | 1 | 0 | 0 | 0 | 0 | 0 | 1 | 1 | 1ST BYTE |
| | 1 | 1 | 1 | 1 | 1 | 1 | 1 | 1 | 2ND BYTE |
| | 0 | 0 | 0 | 0 | 0 | 0 | 0 | 0 | 3RD BYTE |
| | 0 | 0 | 0 | 0 | 0 | 0 | 0 | 0 | 4TH BYTE |
| | 0 | 0 | 0 | 0 | 0 | 0 | 0 | 0 | 5TH BYTE |
| | 0 | 0 | 0 | 0 | 0 | 0 | 0 | 0 | 6TH BYTE |
| | 0 | 0 | 0 | 0 | 0 | 0 | 0 | 0 | 7TH BYTE |
| | 0 | 0 | 0 | 0 | 0 | 0 | 0 | 0 | 8TH BYTE |
| | 0 | 0 | 0 | 0 | 0 | 0 | 0 | 0 | 9TH BYTE |
| | 0 | 0 | 0 | 0 | 0 | 0 | 0 | 0 | 10TH BYTE |
| | 0 | 0 | 0 | 0 | 0 | 0 | 0 | 0 | 11TH BYTE |
| | 0 | 0 | 0 | 0 | 0 | 0 | 0 | 0 | 12TH BYTE |
| LATTICE-POINT OUTPUT VALUE Y | ⋮ | | | | | | | | ⋮ |
| LATTICE-POINT OUTPUT VALUE M | ⋮ | | | | | | | | |
| LATTICE-POINT OUTPUT VALUE C | ⋮ | | | | | | | | |

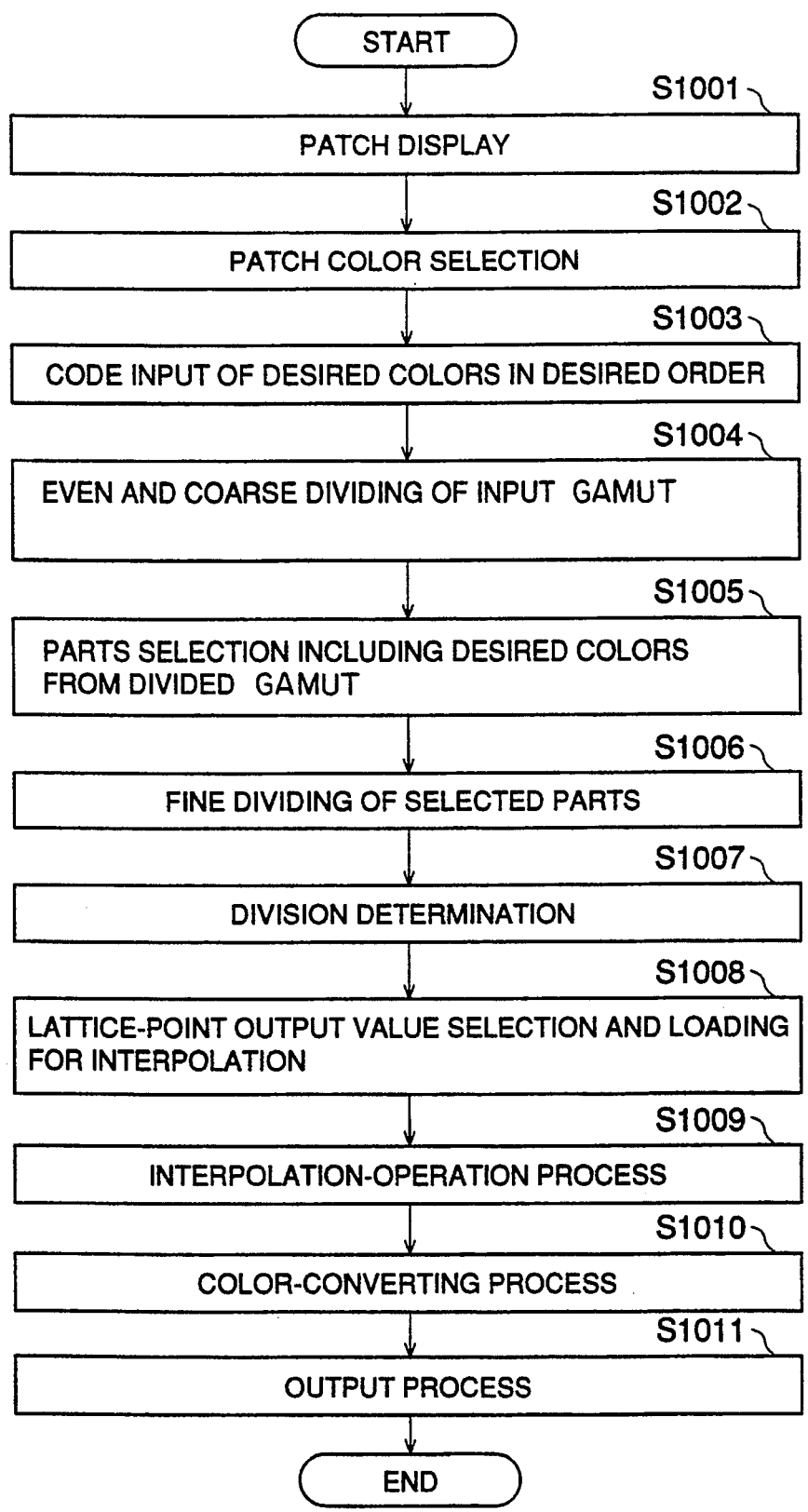

IMAGE PROCESSING APPARATUS HAVING UNEVENLY GAMUT DIVIDING COLOR-CONVERTING FUNCTION

BACKGROUND OF THE INVENTION

1. Field of the Invention

The present invention relates to an image processing apparatus which receives a color-image signal and converts the signal into color-image data for forming an image. In particular, the present invention relates to an image processing system performing a color-converting process, in which process lattice-point color-correction values not used in the color-converting process can be reduced and thus high accuracy can be achieved in the color-converting process. The lattice-point color-correction values are described later and a term 'grid point' may be used instead of the above-mentioned term 'lattice point'. Further, see an English article, A COLOR CORRECTION METHOD FROM STANDARDIZED COLOR-SPACE SIGNALS FOR PRINTERS, written by Manabu KOMATSU, Shogo OHNEDA, Hiroaki SUZUKI and Hiroki KUBOZONO of Ricoh Company Ltd., Japan (Oct. 5-III-p7), in ADVANCES IN NON-IMPACT PRINTING TECHNOLOGIES/JAPAN HARDCOPY +93, pages 545–548.

2. Related Art

A color-converting system in the related art obtains ink/toner quantity control values to form a color image using three colors, Y (yellow), M (magenta) and C (cyan), from color-image density signals indicating densities of three colors, R (red), G (green) and B (blue), using an interpolation method. According to a typical one of such a color-converting system, for example, as shown in FIG. 1, an input color-space extent, that is an input gamut is divided into identical three-dimensional figures such as triangle prisms. Previously calculated color correction values are assigned to each vertex of the three-dimensional figures (vertexes being referred to as lattice points, hereinafter) and color correction values of an input color-decomposed signal are calculated by linear-interpolating the color correction values assigned to the lattice points.

The input gamut is a color-space extent, within which extent input image data can represent colors and which extent is defined due to a capability of a relevant input device such as an image scanner supplying the input image data. An output gamut is a color-space extent, within which extent a relevant output device can reproduce colors and which extent is defined due to a capability of the output device such as a printer. With regard to the basic concept of the color space, see a Japanese book, IMAGE ENGINEERING, written by Toshi MINAMI and Osamu NAKAMURA, published by CORONA PUBLISHING CO., LTD., Tokyo, Japan, edited by Television Society, pages 19–22, '2.2.4 XYZ Color Representing System'. Further, see the above-mentioned English article, A COLOR CORRECTION METHOD FROM STANDARDIZED COLOR-SPACE SIGNALS FOR PRINTERS.

In such a color-converting system in the related art, interpolation accuracy improves as the input color-space divisions are made smaller, that is, a distance between each pair of the lattice points is made smaller. However, making the color-space divisions smaller results in an increase of a number of the lattice points. As a result, a capacity of a memory required to store the color correction values assigned to the lattice points is enlarged and time required to calculate the color correction values for the lattice points is enlarged. Further, hardware construction required for the calculation is made complicated. Further, a color-space color-reproduction extent of an image forming apparatus, that is, the output gamut does not actually have a simple shape such as a cube shown in FIG. 1 but has a complicated shape. Therefore, if it is attempted that color-space extent, that is, a gamut containing the complicated-shaped gamut of the image forming apparatus is evenly divided into small divisions as shown in FIG. 1, it may be necessary to assign many color correction values to lattice points located outside the output gamut.

Thus, in the related art, attempting the interpolation-accuracy improvement can result in many lattice-point color-correction values not actually being used for the color-conversion calculation. Therefore, hardware such as RAM required to load output-value information during the interpolation operation is complicated and time required for the interpolation operation is elongated.

SUMMARY OF THE INVENTION

An object of the present invention is to reduce the number of lattice-point color-correction values not actually being used in the color conversion and thus to perform the color-converting process with a simple hardware construction.

In order to achieve the above object of the present invention, an image processing apparatus according to the present invention will be provided, which apparatus unevenly divides an input gamut and determines lattice-point output values relevant to the resulting uneven divisions. The apparatus receives input color-image data and performs an interpolation operation using the lattice-point output values relevant to the divisions which contain positions representing the input color-image data. Thus, final output values for the received input color-image data are obtained. The above-mentioned uneven dividing is that eliminating lattice points, the lattice-point output values of which are not used for the interpolation operation. Thus, the uneven dividing can reduce the number of resulting divisions and thus can reduce the lattice-point output values relevant to the divisions.

Further, it is preferable that the above-mentioned uneven dividing is that which match features of gamut which an image forming apparatus can reproduce. The image forming apparatus will reproduce an image using the final output values produced by the interpolating operation. Thus, the number of the lattice-point output values can be effectively reduced and thus a capacity of a memory for storing the lattice-point output values can be reduced.

Further, it is preferable that the input gamut is previously finely and evenly divided and that the lattice-point output values relevant to resulting fine and even divisions are previously determined and stored. The thus-stored lattice-point output values are those which include the lattice-point output values relevant to the divisions resulting from the above-mentioned uneven dividing. The uneven dividing can be that which may be different depending on features of the input color-image data, the lattice-point output values relevant to the resulting uneven divisions being then selected from those previously stored. Thus, a capacity of a memory on which are loaded the lattice-point output values to be used for the interpolation operation can be reduced to be a capacity which is required for loading the number of the lattice-point output values actually used for processing the particular input color-image data.

Further, the uneven dividing may be that which matches color distribution in the input gamut, the color distribution being that as to how colors indicating the input color-image data are distributed there. This uneven dividing enables a color-converting process using the interpolating operation which matches the features of the input color-image data. The features of the input color-image data are such as continuous-tone-gradation or discrete-tone-gradation. Further, it is preferable that the apparatus has a function by which a user can select one of modes so as to determine whether the dividing matches the continuous-tone-gradation or matches the discrete-tone-gradation, for example.

Further, the uneven dividing may be that which depends on a user's desire. Specifically, the dividing depends on a part of an image which is represented by the input color-image data, the part being specified by the user. Alternatively, the dividing depends on colors and a priority order of the colors which the user specifies. Thus, the user's desire is effectively reflected on the dividing and thus, it is possible to responds to the user's desire with a reduced number of lattice-point output values.

Other objects and further features of the present invention will become more apparent from the following detailed description when read in conjunction with the accompanying drawings.

BRIEF DESCRIPTION OF DRAWINGS

FIG. 5 illustrates storage contents of a ROM, a basic concept of which contents may be applied to any of first through eighth embodiments of an image processing apparatus according to the present invention;

FIG. 11 shows an operation flow of the image processing unit in the eighth embodiment of the image processing apparatus according to the present invention.

DESCRIPTION OF THE PREFERRED EMBODIMENTS

Figures 2A, 2B:
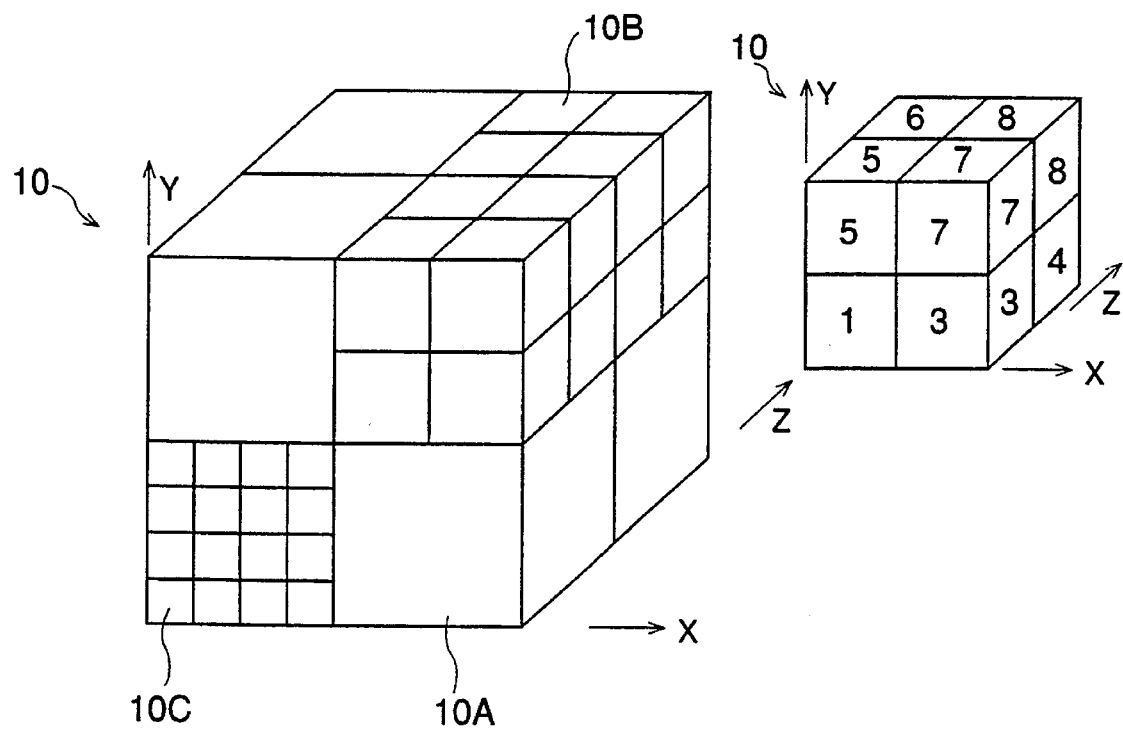
FIGS. 2A and 2B illustrate an input gamut dividing manner for a color-converting process in image processing units in first and second embodiments of an image processing apparatus according to the present invention.

A basic concept of color conversion of an image processing apparatus according to the present invention will be described, using a typical example, with reference to FIGS. 2A and 2B. As shown in FIG. 2A, a cube 10, that is, a three-dimensional figure containing a gamut of input image data is divided into three-dimensional figures similar to one another, that is, cubes, in the example as shown in FIG. 2A.

Figure 1:
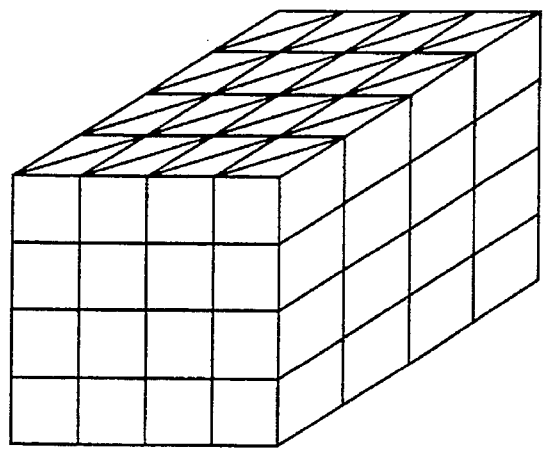
FIG. 1 illustrates an input gamut dividing manner for a color-converting process in the related art.

Instead of a cube, another figure may be applied as a figure of each division. As another example, a triangle prism can be applied to the figure of each division. If the triangle prism is applied to the figure of each division and the cube 10 is divided unevenly, each cube of the 10A, 10B and 10C shown in FIG. 2A is divided into to triangle prisms similarly the case shown in FIG. 1 where each cube is divided into two triangle prisms. The resulting divisions are triangle prisms having three different sizes accordingly corresponding to the sizes of the cubes 10A, 10B and 10C.

Generally speaking, the above gamut of the input image data depends on an input device such as an image scanner supplying the input image data. The color space is represented by an X, Y and Z coordinate space and the sides of the entire cube 10 extend along the X, Y and Z coordinate axes. The partial cubes 10A, 10B and 10C shown in FIG. 2A, that is, the color-space divisions, have three sizes as shown in FIG. 2A. Specifically, each cube of the partial cubes 10A has sides, each of which sides has a length half the length of each side of the entire cube 10. Each cube of the partial cubes 10B has sides, each of which sides has a length ¼ the length of each side of the entire cube 10. Each cube of the partial cubes 10C has sides, each of which sides has a length ⅛ the length of each side of the entire cube 10. With reference to FIG. 2B, cube zones, each cube zone defined by the entire cube 10, are referred to as parts 1, 2 (not shown), 3, 4, 5, 6, 7 and 8, the parts 1 through 8 being obtained as a result of dividing the cube zone of the entire cube 10 along the three coordinate axes X, Y and Z by two. Each of the parts 2, 3, 4, 5 and 6 of the cube 10 is the partial cube 10A. The part 2 is a part behind the part 1, below the part 6, and left of the part 4. Each of the parts 7 and 8 is divided into 8 partial cubes 10B by dividing the partial cubes along each axis of the axes X, Y and Z by two. The part 1 is divided into 64 partial cubes 10C by dividing the partial cube 1 along each axis of the axes X, Y and Z by four.

If output values P resulting from color-converting input values of the input image data are to be obtained, a coordinate point in the X, Y and Z coordinate space representing the input values is determined. Then, a partial cube containing the coordinate point is selected and the 8 vertexes of the selected partial cube are used. Each of vertex of the partial cubes 10A, 10B and 10C, that is, each of the lattice points has a predetermined output value. Using such predetermined output values, output values P corresponding to the above-determined coordinate points are obtained by performing a linear interpolation operation. See the above-mentioned English article, *A COLOR CORRECTION METHOD FROM STANDARDIZED COLOR-SPACE SIGNALS FOR PRINTERS*. If the color-image density signals, such as the R, G, and B signals, are converted into Y, M and C ink/toner amount control values for forming, that is, for representing a relevant image through a printer, the coordinates X, Y and Z correspond to the color components R, G and B signals, respectively and the ink/toner amount control values correspond to the output values P.

Figure 3:
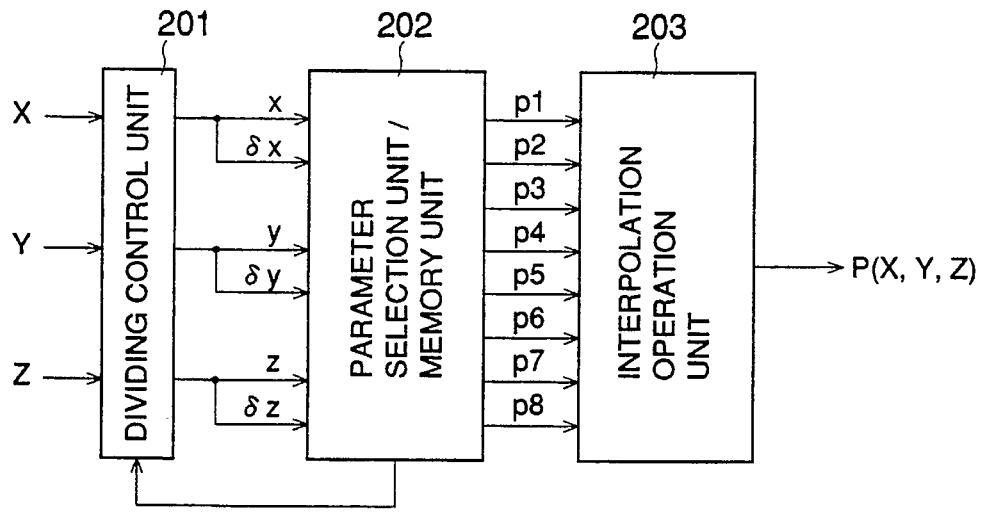
FIG. 3 shows an outline block diagram of the above-mentioned image processing unit in the first embodiment of the image processing apparatus according to the present invention.

With reference to FIG. 3, an outline of an image processing unit in a first embodiment of an image processing system according to the present invention will be described. The image processing unit includes a dividing control unit 201 for performing bit dividing, a parameter selecting unit/memory unit 202 for selecting the partial cubes according to bits divided by the dividing control unit 201, an interpolation operation unit 203 for performing a linear interpolation operation using the output values of the parameter selecting unit/memory unit 202.

Operation of the image forming unit shown in FIG. 3 will now be described with reference to FIGS. 2A and 2B. Input color-component signals are given to the dividing control unit 201 as the X, Y and Z coordinate values. Each value of the coordinate values X, Y and Z consists of a bit series having a bit width of f. The dividing control unit 201 divides the three bit series X, Y and Z into the most significant bits x, y, and z and the other remaining bits δx, δy and δz, respectively. Thus, $X=x+\delta x$, $Y=y+\delta y$, and $Z=z+\delta z$.

Each of the three remaining bit series δx, δy and δz has a bit width of f−1, accordingly. The most significant bits x, y and z indicate a part of the 8 parts 1–8 shown in FIG. 2B.

Further, the remaining bit series δx, δy and δz indicate a position in the thus selected part. If the input values X, Y and Z indicate a position in one of the parts 2, 3, 4, 5 and 6, since each of the parts is not further divided into smaller partial cubes as mentioned above, selection of the partial cube is finished. However, if the input values X, Y and Z indicate a position in one of the remaining parts 1, 7 and 8, the dividing control unit 201 assigns the two most significant bits of each of the X, Y and Z bit series to the respective one of the values x, y and z and each remaining bit series to the respective one of δx, δy and δz. Each of the δx, δy and δz has a bit width of f−2 accordingly. As a result, the x, y and z, each consisting of the two most significant bits of the respective one of the X, Y and Z, indicate a partial cube among partial cubes which are obtained as a result of evenly dividing the entire cube 10 into 64 parts. If the input values X, Y and Z indicate a position in one of the parts 7 and 8, since each of the parts 7 and 8 is divided into the partial cubes 10B which are obtained as a result of evenly dividing the entire cube 10 into 64 parts, the partial-cube selection is finished.

Further, if the input values X, Y and Z indicate a position in the part 1, since the part 1 is further evenly divided into 64 partial cubes 10C, the dividing control unit 201 performs the following operation: The dividing control unit 201 assigns the three most significant bits of each of the X, Y and Z bit series to the respective one of the values x, y and z and each remaining bit series to the respective one of δx, δy and δz. Each of the δx, δy and δz has a bit width of f−3 accordingly. As a result, the x, y and z, each consisting of the three most significant bits of the respective one of the X, Y and Z, indicate a partial cube among partial cubes which are obtained as a result of evenly dividing the entire cube 10 into 512 parts. Since the part 1 is divided into the partial cubes 10C which are obtained as a result of evenly dividing the entire cube 10 into 512 parts, the partial-cube selection is finished.

Thus, the most significant bits x, y and z are used to select a partial cube and then obtain output values set on the 8 vertexes of the thus-selected cube through the parameter selecting unit/memory unit 202. The dividing control unit 201 controls the dividing process performed in the unit 201 based on dividing information given by the parameter selecting unit/memory unit 202. Thus, the bit dividing operations are performed as described above according to matters as to which position in the entire cube 10 corresponds to the input values X, Y and Z. The interpolation operation unit 203 uses the output values of the 8 vertexes and performs a linear interpolation operation so as to obtain final output values P (X, Y and Z).

According to a position in the gamut corresponding to the input values X, Y and Z, how fine the corresponding output values P are interpolated is determined. Specifically, if the position of the input values is located in the partial cube 10A, the interpolation operation for calculating the corresponding output value P is performed relatively coarsely. In fact, with regard to the output values of the 8 vertexes of one of the partial cubes 10A, each of the partial cube 10A has sides, the length of each side being half the length of a side of the entire cube 10 as shown in FIG. 2A. Thus, the interpolation using the output values of the vertexes of the partial cube 10A is relatively coarse. In contrast to this, if the position of the input values is located in the partial cube 10C, the interpolation operation for calculating the corresponding output value P is performed relatively finely. In fact, with regard to the output values of the 8 vertexes of one of the partial cubes 10C, the partial cube 10C has sides, the length of each side being ⅛ the length of a side of the entire cube 10 as shown in FIG. 2A. Thus, the interpolation using the output values of the vertexes of the partial cubes 10A is relatively fine.

Such differences in the interpolation manners according to positions in the gamut corresponding to the input values are obtained from the unevenly divided entire cube 10 shown in FIG. 2A. A manner as to how unevenly the cube 10 is to be divided is determined so as to reduce the above-mentioned lattice-point output values to the necessary ones as will be described later. By such measures as the uneven color-space dividing, it is possible to make a density of the lattice points different in different zones of the gamut. There may be a case, for example, in which merely a small zone of the part 3 in the entire cube 10 shown in FIG. 2B is occupied by the output gamut which the relevant image forming apparatus can reproduce. In such a case, it is not necessary to further divide the part 3 into smaller partial cubes. In fact, if the part 3 were to be divided into smaller partial cubes, some partial cubes among the smaller partial cubes would not be occupied by the output gamut. Such non-occupied smaller partial cubes would not be used in a color converting operation. Therefore, a cube zone in which merely a small region is occupied by the output gamut of the apparatus does not have to be further divided. This prevents useless smaller partial cubes from being produced, that is, it prevents useless lattice points from being produced. Thus, the density of the lattice points to be produced can be arbitrary controlled and thus it is possible that the density of the lattice points of a cube zone matches a matter as to how large a region of the cube zone is occupied by the output gamut of the image forming apparatus. As a result, it is possible to improve efficiency of the color converting-process through a relatively simple hardware construction.

An outline of an image processing unit in a second embodiment of an image processing apparatus according to the present invention will now be described with reference to FIG. 4. The image processing unit in the second embodiment includes a ROM 301 having the color-space dividing information and the output values of the lattice points previously stored therein. The image processing unit further includes an interpolation processing unit 302 which includes a RAM 303 having the lattice-point output values loaded thereon in the color-converting operation. The interpolation processing unit 302 further includes Y-processing unit 304 for the yellow component, M-processing unit 305 for the magenta component and C-processing unit 306 for the cyan component. These processing units 304, 305 and 306 read the information loaded on the RAM 303 and thus produce the Y signal, the M signal and the C signal carrying the final output values P. The image processing unit further includes a CPU 307 for controlling the entirety of the image processing unit based on a predetermined control program.

An operation of the image processing unit in the second embodiment will now be described with reference to FIGS. 2, 4 and 5. The image processing unit divides the gamut of input values according to the color-space output gamut of the relevant image forming apparatus. It is assumed that the gamut dividing manner as shown in FIG. 2A results in the most efficient color-converting process according to the color-space output gamut of the image forming apparatus. That is, the part 1 shown in FIG. 2B has a region thereof which is occupied by the above-mentioned color-space output gamut, the region having a first volume. Further, each of the parts 7 and 8 has a region thereof which is occupied by the above-mentioned color-space output gamut, the region having a second volume. Further, each of the remaining parts 2, 3, 4, 5, and 6 has a region thereof which is occupied by the above-mentioned color-space output gamut, the region having a third volume. Then, it is assumed that the first volume is the largest one among the three volumes, the third volume is the smallest one and the second volume is the intermediate one.

The information stored in the ROM 301 will be described with reference to FIG. 5. As shown in FIG. 5, the 1st through 12th bytes store the gamut dividing information indicating the gamut dividing manner shown in FIG. 2A. This manner results in the most efficient color-converting process according to the color-space output gamut of the image forming apparatus as mentioned above. Specifically, 8 bits of the 1st byte indicate information regarding the 8 parts 1 through 8 shown in FIG. 2B, respectively. The value "1" indicates that the corresponding part is further divided to smaller partial cubes and the value "0" indicates that the corresponding part is not further divided. In fact, the first, seventh and eighth bits are "1" indicating that each of the parts 1, 7 and 8 are further divided into smaller partial cubes (10C, 10B and 10B, respectively, shown in FIG. 2A). The remaining bits are "0" indicating that the remaining parts 2, 3, 4, 5 and 6 are not further divided (10A shown in FIG. 2A).

The 2nd byte shown in FIG. 5 of the gamut dividing information shown in FIG. 5 stores therein information regarding each zone of 8 zones which have been obtained as a result of evenly dividing the part 1 which is shown in FIG. 2B into 8 parts. The dividing by 8 is accomplished by dividing the part 1 along each axis of the axes X, Y and Z by two. As shown in FIG. 2A and as described above, the part 1 is divided into 64 partial cubes 10C by dividing the part 1 along each axis of the axes X, Y and Z by 4. That is, each zone of the above 8 zones corresponds to 8 partial cubes 10C. Thus, each bit of 8 bits consisting of the 2nd byte has the value "1" indicating that each zone of the above 8 zones is further divided into the 8 partial cubes 10C.

Similarly, the 3rd byte of the gamut dividing information shown in FIG. 5 stores therein information regarding each zone of 8 zones which have been obtained as a result of dividing the part 7 which is shown in FIG. 2B into 8 parts. Further, the 4th byte stores therein information regarding each zone of 8 zones which have been obtained as a result of dividing the part 8 which is shown in FIG. 2B into 8 parts. The dividing into 8 parts is accomplished by dividing the part along each axis of the X, Y and Z axes by two. The 8 zones of each of the parts 7 and 8 correspond to the partial cubes 10B shown in FIG. 2A and thus each of the 8 zones is not further divided into smaller partial cubes than the partial cubes 10B. Accordingly, the 3rd and 4th bytes have bits "0" indicating that the relevant zones are not further divided.

The 5th through 12th bytes of the gamut dividing information shown in FIG. 5 store therein information regarding each zone of 64 zones obtained as a result of dividing the part 1 shown in FIG. 2B into 64 parts. The 64 zones correspond to the 64 partial cubes 10C shown in FIG. 2A and thus the 5th through 12th bytes have bits of "0" indicating that the relevant zones are not further divided. As shown in FIG. 5, the ROM 301 stores therein the lattice-point output values Y, M and C of the color components Y, M and C previously assigned to the vertexes of the partial cubes 10A, 10B and 10C shown in FIG. 2A. The partial cubes 10A, 10B and 10C correspond to the zones obtained as a result of dividing the input gamut according to the above-described gamut dividing information (corresponding to the output gamut of the image forming apparatus, that is, resulting in the most efficient color-converting process according to the color-space output gamut of the image forming apparatus as mentioned above). Thus, the lattice-point output values Y, M and C correspond to the gamut dividing information, and the storage of the gamut dividing information and lattice-point output values Y, M and C is such that if a zone is selected among the zones as a result of dividing the input gamut according to the gamut dividing information, the corresponding lattice-point output values Y, M and C are obtained automatically.

Figure 4:
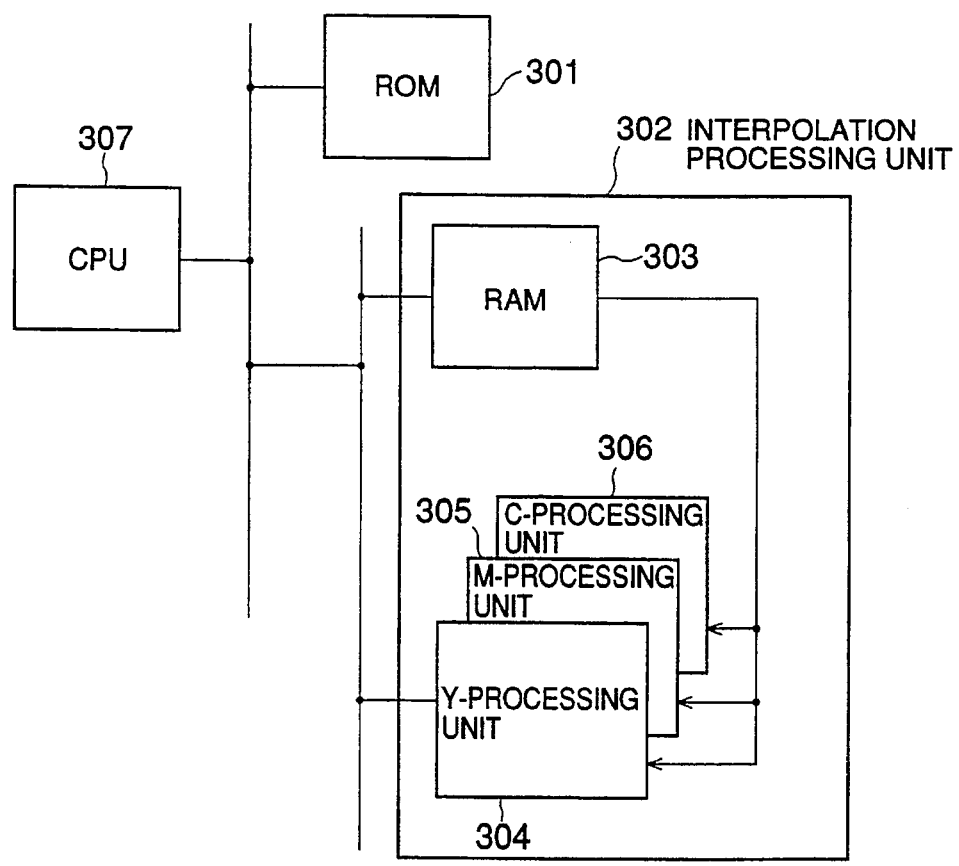
FIG. 4 shows an outline block diagram of an image processing unit in the above-mentioned second embodiment of the image processing apparatus according to the present invention.

In the color-converting process, the CPU 307 shown in FIG. 4 loads, on the RAM 303, the gamut dividing information and the lattice-point output values Y, M and C stored in the ROM 301. The CPU 307 then uses the thus-loaded information for selecting a zone, which contains the position corresponding to the input values, among the zones obtained as a result of dividing the input gamut according to the gamut dividing information. After the zone selection, the CPU 307 obtains lattice-point output values Y, M and C assigned to the selected zone from the RAM 303. The CPU 307 uses the lattice-point output values Y, M and C for performing the interpolation operation so as to obtain the final output values Y, M and C through the Y, M and C-processing units 304, 305 and 306 corresponding to the input values.

Thus, in the image processing apparatus in the second embodiment of the present invention, the manner in which the input gamut is divided unevenly results in the most efficient color-converting process according to the color-space output gamut of the image forming apparatus. That is, similarly to the case where the image processing apparatus in the second embodiment of the present invention is used, it is possible to eliminate the useless lattice-point output values and thus it is possible to reduce the capacity of the memories (ROM 301 and RAM 303) which store the lattice-point output values. As a result, the color-converting process can be performed efficiently in the manner appropriate to the image forming apparatus.

Figure 6:
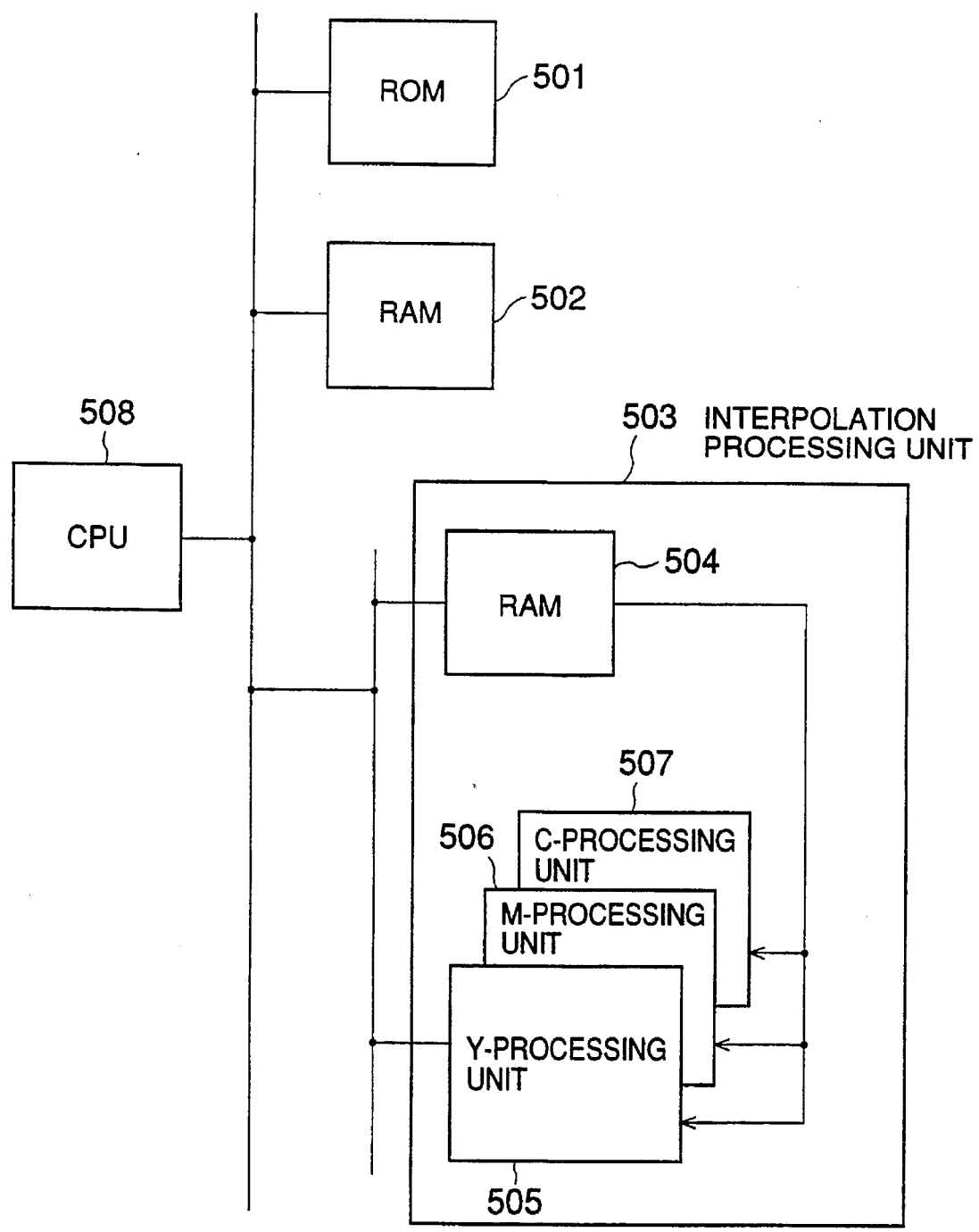
FIG. 6 shows an outline block diagram of an image processing unit in the third embodiment of the image processing apparatus according to the present invention.

With reference to FIG. 6, an image processing unit in a third embodiment of an image processing apparatus according to the present invention will now be described. A ROM 501 stores therein the lattice-point output values which are previously assigned to the lattice points. Input gamut dividing information is loaded on a RAM 502. An interpolation processing unit 503 includes a RAM 504 on which the lattice-point output values obtained from the ROM 501 are loaded in the color-converting process. A Y-processing unit

505, an M-processing unit 506 and a C-processing unit 507 are further included in the interpolation processing unit 503. The Y, M and C-processing units 505, 506 and 507 respectively produce Y, M and C signals using the lattice-point output values loaded on the RAM 504. A CPU 508 controls the entirety of the image processing unit shown in FIG. 6.

An operation of the above-described image processing unit shown in FIG. 6 will now be described. The lattice-point output values stored in the ROM 501 are the lattice-point output values corresponding to the lattice points produced as a result of evenly dividing the input gamut into fine zones. The CPU 508 converts input gamut dividing instructions previously stored therein into the input gamut dividing information shown in FIG. 5, and loads the input gamut dividing information 5 on the RAM 502. The dividing information shown in FIG. 5 indicates the uneven dividing as described above. The CPU 508, in the color-converting process, uses the dividing information loaded on the RAM 502 and thus selects the lattice-point output values assigned to the lattice points produced as a result of dividing the input gamut according to the dividing information indicating the uneven dividing. The uneven dividing is performed such that only the lattice-point output values relevant to the input values are selected. Specifically, a input-value position corresponding to the input values is determined in the input gamut and the input gamut is divided into fine zones which include a fine zone containing the input-value position. The dividing operation is repeated according to the dividing information shown in FIG. 5 and the final fine zone containing the input-value position is obtained. The lattice-point output values assigned to the 8 vertexes of the final fine zone are obtained and loaded on the RAM 504. The lattice-point output values are selected from among those stored in the ROM 501. The CPU 508 loads the thus-selected output values on the RAM 504.

In the color-converting process, the CPU 508 uses the dividing information loaded on the RAM 502 and thus performs the interpolation operation through the Y-, M- and C-processing units 505, 506 and 507. By the interpolation operation, the final output values relevant to the input values are obtained by interpolating the relevant lattice-point output values. The relevant lattice-point output values are obtained from the lattice-point output values loaded on the RAM 504 relevant to the input values according to the dividing information loaded on the RAM 502.

Thus, in the image processing unit in the third embodiment of the present invention, the input gamut is previously evenly divided into fine zones and the corresponding lattice-point output values are previously stored in the ROM 501. Then, the input gamut is unevenly divided and the uneven dividing manner depends on the image forming apparatus, as described above. That is, the uneven input gamut dividing results in the most efficient color-converting process according to the color-space output gamut of the image forming apparatus. The lattice-point output values assigned to the lattice points produced as a result of the uneven dividing are selected from among those stored in the ROM 501. The selected output values are loaded on the RAM 504 and are used in the interpolation operations. The output-value selection is performed such that only the output values relevant to the input values are selected using the dividing information loaded on the RAM 502. As a result, by the output-value selection, it is possible to reduce a capacity of the RAM 504 on which the lattice-point output values, that is, the vertex color correction values are loaded. As a result, the color correction, that is, the color conversion can be performed at high accuracy and at high speed using a simple hardware construction.

Figure 7:
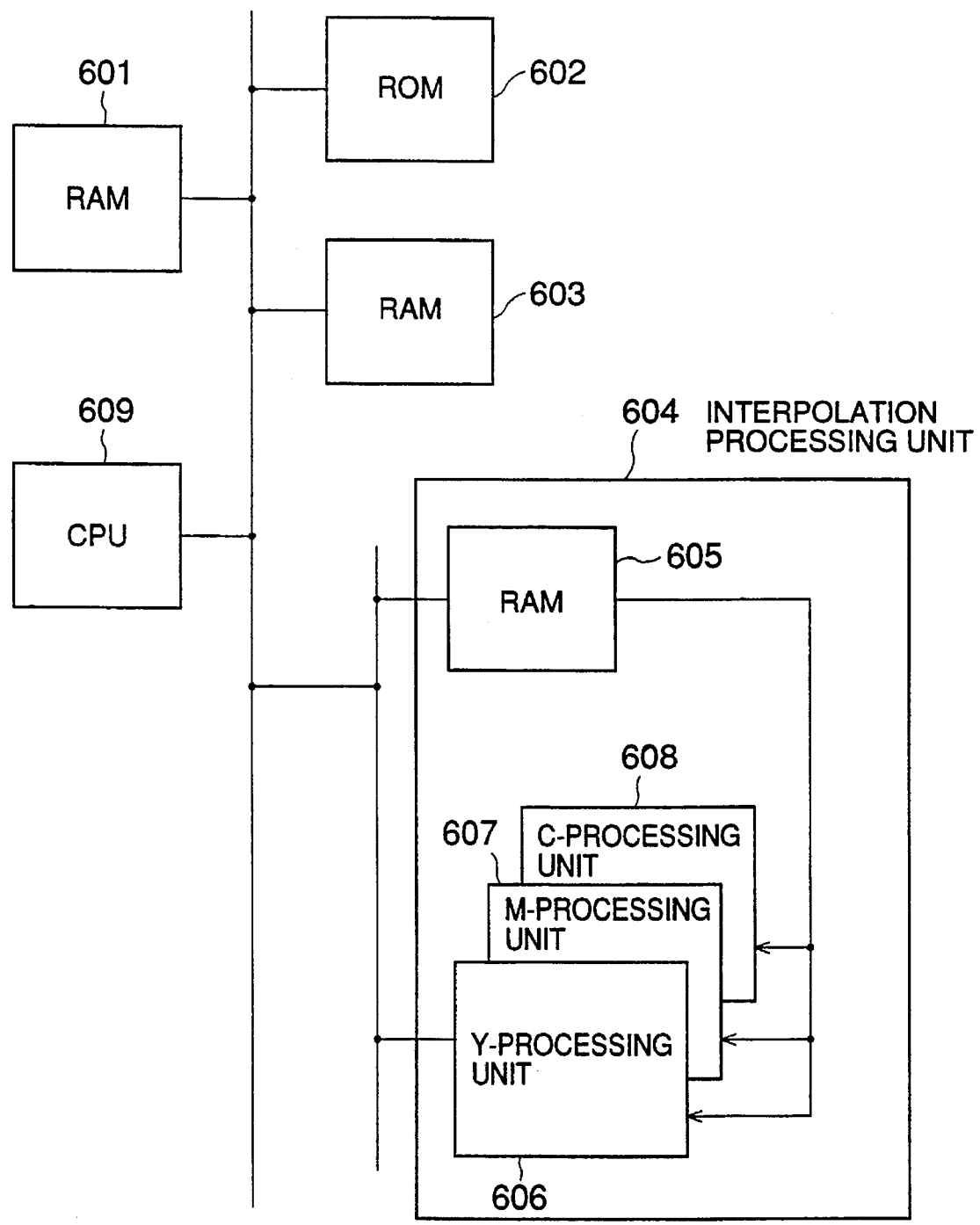
FIG. 7 shows an outline block diagram of an image processing unit in the fourth and fifth embodiments of the image processing apparatus according to the present invention.

With reference to FIG. 7, an image processing unit in a fourth embodiment of an image processing apparatus according to the present invention will now be described. A RAM 601 temporarily stores thereon input image data and operation results obtained during determination of the dividing. A ROM 602 stores therein the lattice-point output values. The input-gamut dividing information is loaded on a RAM 603. An interpolation processing unit 604 includes a RAM 605 on which the lattice-point output values obtained from the ROM 602 are loaded in the color-converting process. A Y-processing unit 606, an M-processing unit 607 and a C-processing unit 608 are further included in the interpolation processing unit 604. The Y-, M- and C-processing units 606, 607 and 608 respectively produce Y, M and C signals using the lattice-point output values loaded on the RAM 605. A CPU 609 controls the entirety of the image processing unit shown in FIG. 7.

An operation of the above-described image processing unit will now be described. The CPU 609 divides the input gamut in the X, Y and Z coordinate space, the gamut being assumed to be a cube. The dividing is such that each coordinate axis is divided by $2^n$ and thus the gamut is divided into $2^{3n}$ cubes. The input values are assumed to consist of X, Y and Z coordinate values as mentioned above in the description of the first embodiment. Each of the values X, Y and Z has an 'f' bit width and the values are expressed by the following expressions:

$$X=x+\delta x, \quad Y=y+\delta y, \quad Z=z+\delta z.$$

Each of the f-bit values X, Y and Z is divided into the n most significant bits and the remaining (f-n) bits. Each of the x, y and z in the above expressions represents the above-mentioned n most significant bits and each of the $\delta x$, $\delta y$ and $\delta z$ represents the above-mentioned remaining (f-n) bits.

Each input image data unit, each consisting of the input values, X, Y and Z, loaded on the RAM 601 is classified to be a coordinate point in a relevant zone of the above-mentioned $2^{3n}$ cubes using the above-mentioned most significant bits, x, y and z of the X, Y and Z. A number of data units given for each zone of the $2^{3n}$ zones is counted using the above classification. The counted results are stored in the RAM 601. Using the counted results, the $2^{3n}$ zones are classified into a first group of zones and a second group of zones. The classification is made so that in each zone of the first group of zones, a ratio of the number of input data units counted for the zone to a whole number of input data units is larger than a reference value. The remaining zones of the $2^{3n}$ zones are the second group of zones. The dividing information indicating that relevant zones are not further divided is given to the second group of zones and is loaded on the RAM 603. This dividing information indicating not to further divide corresponds to the dividing information bit "0" shown in FIG. 5. The dividing information indicating that relevant zones are further divided is given to the first group of zones and is loaded on the RAM 603. This dividing information indicating to further divide corresponds to the dividing information bit "1" shown in FIG. 5.

For the first group of zones, in the above expressions, each of the above-mentioned x, y and z of the input values X, Y and Z represents the (n+1) most significant bits of the respective one of the X, Y and Z. Each of the first group of zones is further divided into 8 parts. The above-mentioned x, y and z, each representing the (n+1) bits, are used to determine that a coordinate point of the input values X, Y and Z is in a zone of the zones thus divided into 8 parts. Thus, the input data units are classified for the 8 divided zones. A number of input data units classified for each of the 8 divided zones is counted. Using the counted results, the process such as that described above is performed to classify the 8 divided zones into the two groups and each zone of the first group of zones is further divided. The above-described operation is repeated until the number of the input data units counted for each of the thus-divided zones is not larger than the reference value. However, a capacity of the RAM 605 is considered to limit the above-mentioned repetition.

Thus, the dividing processes are performed and the relevant information is stored in the RAM 601. In the color-converting process, the CPU 609 uses the dividing information loaded on the RAM 603 as mentioned above in the dividing process to select the relevant lattice-point output values from among those stored in the ROM 602. The CPU 609 loads the thus-selected output values on the RAM 605. An operation of using the dividing information to select the relevant lattice-point output values and an operation of using the lattice-point output values to obtain the final output values relevant to the input values are substantially the same as those performed in the image processing unit in the third embodiment of the present invention. Thus, the description thereof is omitted here.

Thus, in the image processing unit in the fourth embodiment of the present invention, the input gamut is first evenly divided. Then, the input image data units are counted for each of the thus evenly divided zones. Each of the zones for which many input image data units are counted is further divided. As a result, a region in the gamut which contains many input image data units is finely divided. The fine dividing results in that the subsequently performed interpolation operation is performed finely. In order to realize high-accuracy fine color-tone reproduction, it is effective to perform such a fine interpolation operation on the region containing many input image data units in the input gamut. Such an effective operation can be achieved as a result of the above automatic dividing manner determination. That is, how fine each of the zones is divided is automatically determined using the above-mentioned counted results. The dividing is appropriate to the input image represented by the input image data. As a result, without requiring a user's particular specifications, high-accuracy color correction, that is, the high-accuracy color-converting process can be achieved using a simple hardware construction. The above-described operation is especially effective to process image data representing a continuous-tone-gradation image such as a nature-describing picture. This is because the above-described method enables highly accurate color-converting particularly for colors which are used frequently in the input image. In fact, the nature-describing picture has continuous tone-gradation and thus an identical color may not be used frequently, that is, the used colors is scattered. For such input images as the nature-describing pictures, it is appropriate to control the color-converting accuracy depending on the number of pixels included in each of the divided zones.

The nature-describing picture is an picture having continuous tone-gradation as mentioned above. In fact, actual images present in the natural world consist of completely continuous tone-gradation different from a printed image having discrete tone-gradation (256 tones or the like).

An image processing unit in a fifth embodiment of an image processing apparatus according to the present invention will now be described with reference to FIG. 7. The number of the input data units is counted for each zone in the above-described image processing unit in the fourth embodiment of the present invention. In contrast to this, the image processing unit in the fifth embodiment detects a input-data-unit distribution state for each zone as will be described later. Other construction and operation thereof are similar to those of the image processing unit in the fourth embodiment.

In the image processing unit in the fifth embodiment, similarly to that in the fourth embodiment, the input values are assumed to consist of X, Y and Z coordinate values. Each of the values X, Y and Z has an 'f' bit width and the values are expressed by the following expressions:

$$X=x+\delta x,\ Y=y+\delta y,\ Z=z+\delta z.$$

Each of the f-bit values X, Y and Z is divided into the n most significant bits and the remaining (f-n) bits. Each of the x, y and z in the above expressions represents the above-mentioned n most significant bits and each of the $\delta x$, $\delta y$ and $\delta z$ represents the above-mentioned remaining (f-n) bits.

Each input image data unit, each consisting of the input values, X, Y and Z, loaded on the RAM 601 is classified to be a coordinate point in a relevant zone of the above-mentioned $2^{3n}$ cubes using the above-mentioned most significant bits, x, y and z of the X, Y and Z. The above-mentioned $\delta x$, $\delta y$ and $\delta z$ of the input data units are used to count as to how many different coordinate points are present in each zone of the $2^{3n}$ zones, the points being represented by $\delta x$, $\delta y$ and $\delta z$. In the counting, if many input data units represent the same coordinate point, only one point is counted therefor. The counted results are stored in the RAM 601. Using the counted results, the $2^{3n}$ zones are classified into a first group of zones and a second group of zones. The classification is made so that in each zone of the first group of zones, a ratio of the number of the different coordinate points represented by the input data units present in the zone to the whole number of input data units is larger than a reference value. The remaining zones of the $2^{3n}$ zones are the second group of zones. The dividing information indicating that relevant zones are not further divided is given to the second group of zones and is loaded on the RAM 603. This dividing information indicating not to further divide corresponds to the dividing information bit "0" shown in FIG. 5. The dividing information indicating that relevant zones are further divided is given to the first group of zones and is loaded on the RAM 603. This dividing information indicating to further divide corresponds to the dividing information bit "1" shown in FIG. 5.

For the first group of zones, each of the above-mentioned x, y and z of the input values X, Y and Z represents the (n+1) most significant bits of the respective one of the X, Y and Z. Each of the first group of zones is further divided into 8 parts. The $\delta x$, $\delta y$ and $\delta z$, each representing the remaining (f-n-1) bits, are used to determine that a coordinate point of the input values X, Y and Z in a zone of the 8 divided zones. Thus, a number of coordinate points represented by the input data units that are present in each of the 8 divided zones is counted. Using the counted results, the process such as that described above is performed to classify the 8 divided zones into the two groups and each zone of the first group of zones is further divided. The above-described operation is repeated until the number of the input data units counted for each of the thus-divided zones is not larger than the reference value. However, the capacity of the RAM 605 is considered to limit the above-mentioned repetition.

Thus, the dividing processes are performed and the relevant information is stored in the RAM 601. In the color-converting process, the CPU 609 uses the dividing information loaded on the RAM 603 as mentioned above in the dividing process to select the relevant lattice-point output values from among those stored in the ROM 602. The CPU 609 loads the thus-selected output values on the RAM 605. An operation of using the dividing information to select the relevant lattice-point output values and an operation of using the lattice-point output values to obtain the final output values relevant to the input values are substantially the same as those performed in the image processing unit in the third embodiment of the present invention. Thus, the description thereof is omitted here.

Thus, in the image processing unit in the fifth embodiment of the present invention, the input gamut is first evenly divided. Then, the different coordinate points represented by the input image data units are counted for each of the thus-evenly-divided zones. Each of the zones for which many different coordinate points are counted is further divided. As a result, a region in the gamut which contains many different coordinate points of the input data units is finely divided. The fine dividing results in that the subsequently performed interpolation operation is performed finely. In order to realize high-accuracy fine color-tone reproduction, it is effective to perform such a fine interpolation operation on the region containing many coordinate points of the input image data units in the input gamut. Such an effective operation can be achieved as a result of the above automatic dividing manner determination. That is, how fine each of the zones is divided is automatically determined using the above-mentioned counted results. The dividing is appropriate to the input image represented by the input image data. As a result, without requiring a user's particular specifications, high-accuracy color correction, that is, the high-accuracy color-converting process can be achieved using a simple hardware construction. Especially, the above-described effective operation is effective to process image data representing a discrete-tone-gradation image such as a computer-graphics (CG)-produced picture. This is because, if the input image comprises the discrete-tone-gradation image, it is likely that an identical color is used frequently. For example, it may be that although many pixels is included in one of the divided zones, the pixels represent only a single color. In such a case, it is appropriate to determine, whether or not a relevant zone is further divided, depending on the color-distribution state in the zone.

The difference between the above-described counting method according to the fourth embodiment and that according to the fifth embodiment will now be described again using a concrete example. It is assumed that the input image data is represented by 11 XYZ coordinate points (0, 0, 0), (0, 0, 0), (0, 0, 1), (0, o, 1), (1, 2, 3), (2, 2, 2), (2, 2, 2), (2, 3, 2), (2, 3, 3), (3, 3, 3) and (3, 3, 3). Under the assumption, it is also assumed that the counting is performed on the divided zone of the coordinate space extent having the X-coordinate extent of 0-2, Y-coordinate extent of 0-2 and Z-coordinate extent of 0-2. The 7 points (0, 0, 0), (0, 0, 0), (0, 0, 1), (0, 0, 1), (1, 2, 3), (2, 2, 2) and (2, 2, 2) are included in the coordinate space extent. As a result, in the counting method according to the fourth embodiment, the value resulting from the counting is 7. However, in the counting method according to the fifth embodiment, the value resulting from the counting is 4. This is because the method of the fifth embodiment counts 4 different points (0, 0, 0), (0, 0, 1), (1, 2, 3) and (2, 2, 2).

An image processing unit in a sixth embodiment of an image processing apparatus according to the present invention will now be described. In general, the image processing unit in the sixth embodiment enables selective performing of either the gamut dividing process of the image processing unit in the above-mentioned fourth embodiment or the gamut dividing process of the image processing unit in the above-mentioned fifth embodiment. A user may select one of the above-mentioned processes after the user determines whether the input image data is image data representing a continuous-tone-gradation image such as a nature picture or a discrete-tone-gradation image such as a CG-produced picture.

Figure 8:
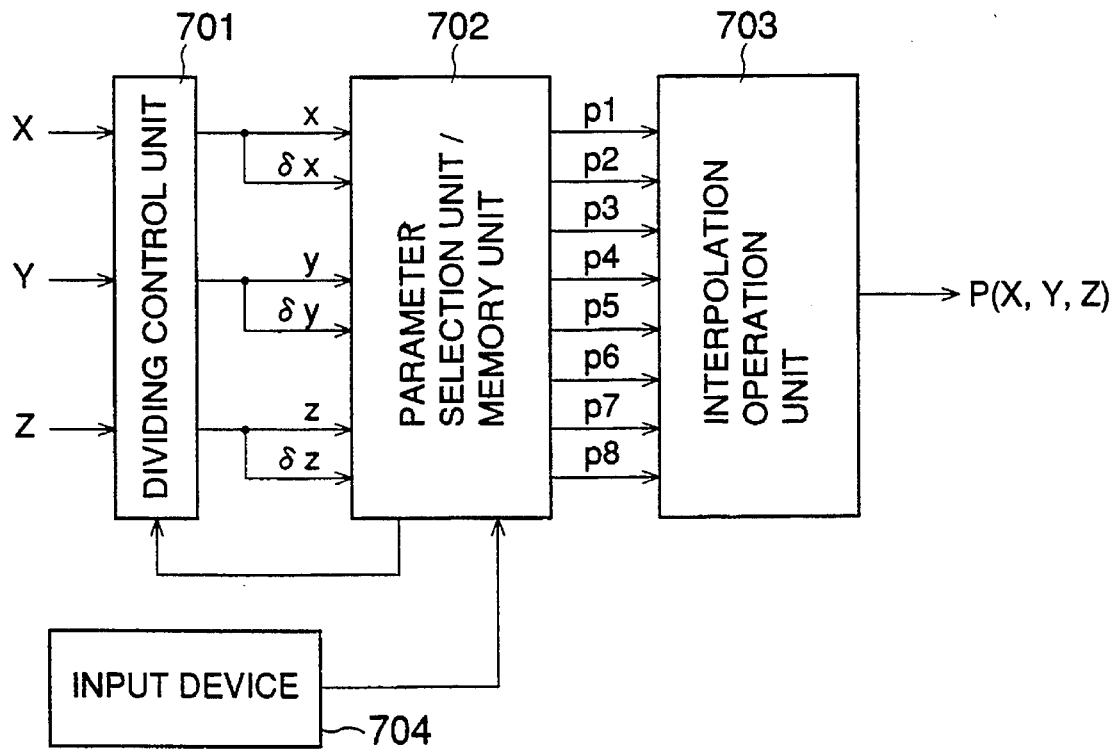
FIG. 8 shows an outline block diagram of an image processing unit in the sixth embodiment of the image processing apparatus according to the present invention.

With reference to FIG. 8, the image processing unit in the sixth embodiment includes a dividing control unit 701 for performing bit dividing, a parameter selecting unit/memory unit 702 for selecting the partial cubes according to bits divided by the dividing control unit 701, an interpolation operation unit 703 for performing a linear interpolation operation using the output values of the parameter selecting unit/memory unit 702. An input device 704 is used for a user to input color-processing modes to the image processing unit.

Basic operation of the above-described image processing unit will now be described. The user inputs a desired mode of the color-processing modes through the input device 704. The parameter selection unit/memory unit 702 selects a program appropriate to the thus-input mode. The dividing control unit 701 performs the gamut dividing operation according to the thus-selected program.

The gamut dividing operation is performed either in a manner similar to that in which the image processing unit in the fourth embodiment performs the gamut process as described above or in a manner similar to that in which the image processing unit in the fifth embodiment performs the gamut process as described above. The programs selected by the parameter selection unit/memory unit 702 indicate the above-mentioned manner of the fourth embodiment and manner of the fifth embodiment. Whether the above-mentioned manner of the fourth embodiment or manner of the fifth embodiment is performed is determined as a result of the mode selection performed by the user through the input device 704.

Thus, it is possible to selectively perform, by inputting the relevant modes, the different gamut dividing processes appropriate to various input image data such as that representing images having various features such as the continuous-tone-gradation or the discrete-tone-gradation. As a result, the color-correction processes, that is, the color-converting processes are performed in manners appropriate to the input image data of the images having the various features. As a result, it is possible to realize high-accuracy fine color-tone reproduction appropriate to the input image data of the images having the various features using a simple hardware construction.

Figure 9:
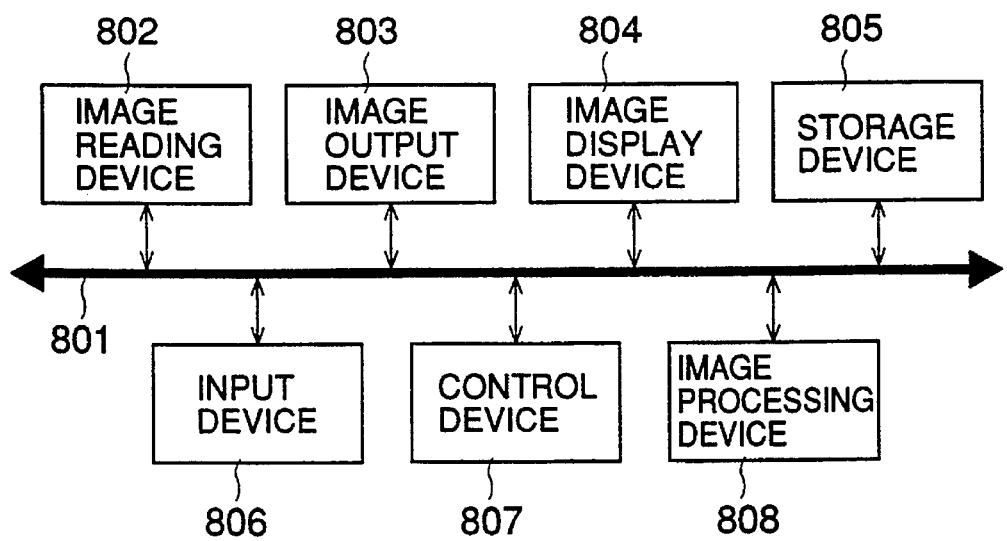
FIG. 9 shows an outline block diagram of an image processing systems in the seven and eighth embodiments of the image processing apparatus according to the present invention.

With reference to FIG. 9, an image processing system in a seventh embodiment of an image processing apparatus according to the present invention will now be described. A system bus 801 carries control signals and image data among devices connected with the system bus 801. An image reading device 802 such as an image scanner for reading-in an image to supply digital data is connected with the system bus 801. An image output device 803 such as a printer for printing an image on a recording sheet is also connected with the system bus 801. An image display device 804 such as a monitor for displaying an image is also connected with the system bus 801. Further, a storage device 805 such as a hard disk device is also connected with the system bus 801. An input device 806 for a user to input a processing specification and setting to the image processing system is also connected with the system bus 801. The input device 806 also displays thus input information. A control device 807 controlling the above-mentioned devices and an image processing device 808 for processing and editing digital image data are also connected with the system bus 801.

Figure 10:
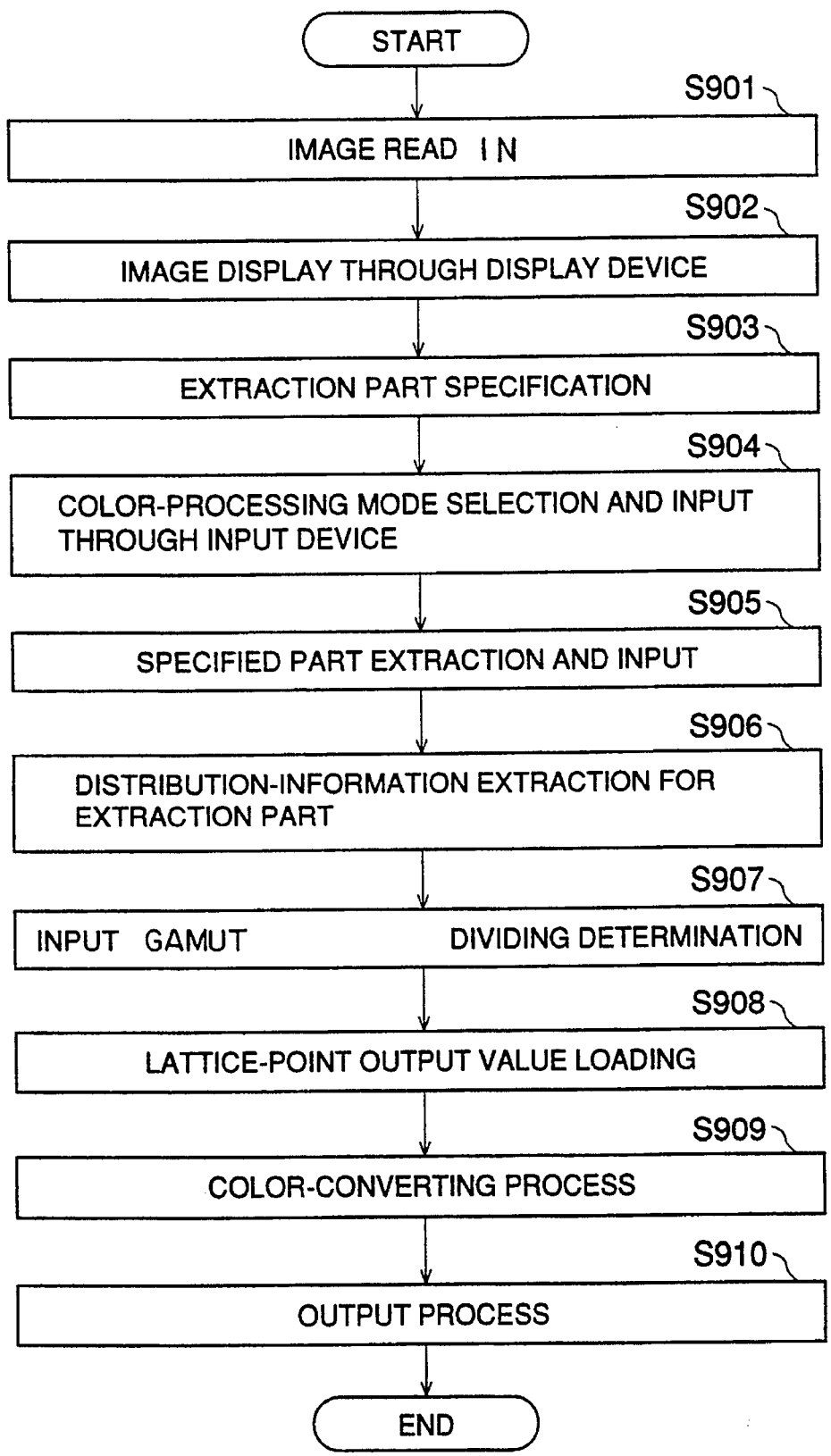
FIG. 10 shows an operation flow of the image processing unit in the seventh embodiment of the image processing apparatus according to the present invention.

Operation of the above-described image processing system shown in FIG. 9 will now be described with reference to FIG. 10. The image reading device 802 or the like is used to read in image data in a step S901. The term 'step' will be omitted so that, for example, 'the step S901' will be simply expressed as 'S901', hereinafter. The thus read-in image data is displayed through the image display device 804 in S902. The user views the display and determines an image part of the displayed image, for which image part the user especially needs accurate reproduced colors. The user specifies the image part (extracting image part) in S903 through the input device 806. The user selects a desired mode from among the color-processing modes such as those for the continuous-tone-gradation image and for the discrete-tone-gradation image described above in the description of the fourth, fifth and sixth embodiments. The user inputs the thus-selected mode through the input device 806. In S905, user performs, through the input device 806, the portion in the displayed image specified in S903 and thus inputs the portion to the image processing system.

The image processing device 808 uses the thus-input extracting image part and color-processing mode to extract distribution information in the input gamut in S906. The distribution-information extraction for the thus-input extracting image part is performed according to the relevant color-processing mode. In the mode for the continuous-tone-gradation image, for example, the distribution information indicates how many input data units are present in each zone of the gamut of the above-mentioned extracting image part as described above in the description of the fourth embodiment. In the mode for the discrete-tone-gradation image, for example, the distribution information indicates how many different coordinate points are present in each zone of the input gamut of the above-mentioned extracting image part as described above in the description of the fifth embodiment. In S907, the image processing device 808 uses the thus-obtained distribution information of the extraction image part for determining a manner of the input gamut dividing. The manner to be determined may be either a manner in which the input gamut is divided using the distribution information as described in the description of the fourth embodiment or a manner in which the input gamut is divided using the distribution information as described in the description of the fifth embodiment. Which of the manners is selected is determined according to which of the color-processing modes has been determined in S904. In S908, the lattice-point output values are selected relevant to the zones finally obtained as a result of the input gamut dividing in the manner determined in S907. The lattice-point values thus selected in S908 are selected from among those previously stored in a ROM included in the image processing device 808. The ROM previously stores the lattice-point output values, it being possible that the lattice-point output values to be stored in the ROM are selected in S908. Then, the input image data read in, in S901, is applied to the relevant zones finally obtained as a result of the above-mentioned input gamut dividing. In S909, the interpolation operations are performed using the lattice-point output values loaded on a RAM included in the image processing device 808 in S908 so as to obtain the final output values as described above. Thus, the color-converting process is performed using lattice-point output values obtained as a result of the input gamut dividing in the manner determined only depending on the distribution information of the extraction image part which has been specified by the user. In S910, the image output device 803 prints out an image using the final output values obtained in S909.

Thus, in the image processing system in the seventh embodiment of the present invention, the input gamut dividing manner is determined only depending on the distribution information of the extraction image part which has been specified by the user as described above. It is likely that the dividing manner determined only depending on the distribution information of the extraction image part is a manner not so complicated since the distribution information is obtained from the extraction image part, that is, a small image part in the entire input image. It is thus likely that the limited image part has a small gamut in the entire gamut which the entire input image has. As a result, it is likely that the gamut dividing has to be performed only for the small gamut and thus the number of zones obtained as a result of the dividing is small. Thus, the number of the lattice-point output values to be loaded in S908 may be reduced. However, since the extraction image part is specified by the user, the image part for which the user especially needs accurate reproduced colors, the gamut dividing which can fulfill the user's needs is determined in S907. Thus, the lattice-point output values loaded in S908 and the color-converting process in S909 using the loaded lattice-point output values are those which can fulfill the user's needs. Thus, it is possible to effectively reduce the number of zones produced as a result of the gamut dividing and the number of the lattice-point output values. As a result, a capacity of the RAM on which the lattice-point output values are loaded in S908 can be reduced. Further, instead of reducing the RAM capacity, it is also possible to keep the RAM capacity and thus to effectively increase lattice-point output values for the necessary zones. As a result, it is possible to improve color-reproduction accuracy since increase of the number of lattice-point output values for a unit area of the zones results in improvement of color-reproduction accuracy relevant to those zones. This is because, in principle, the color-correction operation is an operation in which a non-linear system is approximated to a linear system. Thus, as the number of reference points is increased, the relevant accuracy is improved.

Also, it is possible to print out through the output device 803 the image having features which the user desires. This can be achieved by applying the color-correction process, that is, the color-converting process, a manner of which is determined according to the extraction image part which the user has specified. Thus, an image can be reproduced in high accuracy according to the user's desire using a simple hardware construction.

Further, the input color-space dividing manner is determined only depending on the distribution information obtained from the extraction image part as described above in the image processing system in the seventh embodiment. As a result, it is possible to reduce time required for a process to determine the input color-space dividing manner. Thus, process efficiency can be improved.

With reference to FIGS. 9 and 11, an image processing system in an eighth embodiment of an image processing apparatus according to the present invention will now be described. The image processing system in the eighth embodiment has a basic construction which is the same as that of the image processing system in the seventh embodiment described with reference to FIG. 9. The image display device 804 displays on its display screen previously stored color patches in S1001, the image output device being able to reproduce the color samples of the patches. The color patches are used to indicate colors and are supplied, for example, as a result of determining the colors as follows: The relevant XYZ gamut is divided so as to be divided by 12 along each axis-direction and the coordinate points of the vertexes of the resulting division cubes are obtained. The colors represented by the thus obtained coordinate points are obtained and colors are selected from among the thus obtained colors, the colors to be selected being those included in the gamut of the relevant output device. The thus colors are displayed as the patches.

An user may select colors among the colors of the displayed patches in S1002, the user requiring accurate reproduction of the selected colors. The user may select a plurality of colors in S1002. The user inputs the thus-selected desired colors through the input device 806 in a desired order in S1003, the user using predetermined codes for the input. The image processing device 808 evenly and relatively coarsely divides the input gamut in S1004, for example, divides the gamut so that the gamut is divided along each axis of the X, Y and Z axes by 4 and thus the gamut is divided into 64 parts. In S1005, the image processing device selects the parts, including the desired colors selected in S1002, from among the parts obtained as a result of the dividing in S1004.

In S1006, each of the parts of the gamut selected in S1005 is further divided. This further dividing of the selected parts is performed so that the part, among the selected parts, which part includes the color of the highest order according to the desired color order specified in S1003 is first divided. Then, the part, among the remaining selected parts, which part includes the color of the order subsequent to the highest order according to the desired color order is divided. Similarly, the parts are picked up from the remaining selected parts to be divided according to the order of the colors included in the parts. However, the capacity of the RAM, included in the image processing device 808, for loading thereon the lattice-point output values in S1008 is considered. That is, the dividing in S1007 results in an increase of the number of divisions of the gamut accordingly and thus results in an increase in the number of the lattice-point output values assigned to the vertexes of the divisions which are to be loaded on the above-mentioned RAM. Therefore, the dividing in S1006 is performed on the gamut parts part by part according to the desired color order until the resulting number of the divisions reaches a certain number. The certain number is a number which results in that the resulting number of the lattice-point output values to be loaded on the RAM reaches the capacity of the RAM.

In S1007, the image processing device 808 determines the divisions, that is, the zones finally obtained as a result of dividing the gamut parts in S1006. In S1008, the lattice-point output values are selected relevant to the zones. The lattice-point output values thus selected in S1008 are selected from among those previously stored in the ROM included in the image processing device 808. The ROM previously stores the lattice-point output values, it being possible that the lattice-point output values to be stored in the ROM are selected in S1008. In S1009, the interpolation operations are performed using the lattice-point output values loaded on the RAM included in the image processing device 808 in S1008 so as to obtain the final output values as described above. Then, the color-converting process is performed in S1010 using the lattice-point output values obtained as a result of the dividing the input gamut in the manner determined depending on the colors selected by the user and the order of priority of the selected colors specified by the user in S1002. In S1011, the image output device 803 prints out an image using the final output values obtained in S1010.

The above finely dividing step S1006 will now again be described using a concrete example. The coarsely divided zone which includes the coordinate point representing the desired color of the first priority is divided so as to be divided by two along each axis-direction. This fine dividing process is repeated for the desired colors in the desired order (priority order) until the thus finely dividing is performed on, for example, the 8 coarsely divided zones among the whole 64 coarsely divided zones. In this finely dividing operation, if the same coarsely divided zone includes a plurality of the desired colors, the finely dividing is performed once on the same coarsely divided zone and another one of the desired colors in the subsequent order is processed.

Thus, in the image processing system in the eighth embodiment of the present invention, the input gamut dividing manner is determined depending on the colors selected by the user and the order of priority of the selected colors specified by the user as described above. Thus, the number of zones which are finally obtained as a result of dividing in S1006 can be reduced from the case where each of all the parts of the input gamut was further divided evenly in S1006. The zone number reduction is achieved by reducing the parts to be further divided in S1006 as a result of the user selecting the colors and specifying the color order of priority in S1002. By reducing the number of final division zones, the number of the lattice-point output values to be loaded in S1008 can be reduced. As described above, the input gamut part dividing is performed in S1006 on the parts including the colors selected by the user, of which colors the user especially needs accurate reproduction. Thus, the gamut divisions which can fulfill the user's needs are determined in S1007. Thus, the lattice-point output values loaded in S1008, the interpolation operation process performed in S1009, and the color-converting process performed in S1010, using the loaded lattice-point output values are those which can fulfill the user's needs. Thus, it is possible to effectively reduce the number of zones produced as a result of the gamut dividing and the number of the lattice-point output values. As a result, a capacity of the RAM on which the lattice-point output values are loaded in S1008 can be reduced. Also, it is possible to print out through the output device 803 the image having features which the user desires. This can be achieved by applying the color-correction process, that is, the color-converting process, a manner of which is determined according to the colors and the their order of priority which the user specifies. Thus, an image can be reproduced in high accuracy according to the user's desire using a simple hardware construction.

Further, the present invention is not limited to the above-described embodiments, and variations and modifications may be made without departing from the scope of the present invention.

What is claimed is:

1. An image processing apparatus comprising:

uneven dividing means for unevenly dividing an input gamut into divisions which have figures similar to one another;

output-value determining means for determining predetermined lattice-point output values relevant to said divisions;

division selecting means for selecting a division among said divisions obtained through said uneven dividing means;

the selected division corresponding to given input color-image data; and interpolating means for interpolating final output values for said given input color-image data using the lattice-point output values relevant to said division selected through said division selecting means; and the uneven dividing performed by said uneven dividing means being that eliminating lattice points of which the lattice-point output values are not used in the interpolating performed by said interpolating means.

2. The image processing apparatus according to claim 1, wherein the uneven dividing performed by said uneven dividing means is performed so as match colors which can be reproduced by an image forming apparatus which reproduces an image using said final output values.

3. The image processing apparatus according to claim 1, further comprising storing means for previously storing therein the lattice-point output values which are relevant to divisions obtained as a result of evenly and finely dividing said input gamut;

the even and fine dividing being performed such that said lattice-point output values stored in said storing means can include the lattice-point output values which are determined by said output-value determining means.

4. The image processing apparatus according to claim 3, wherein said even and fine dividing being performed is such that the divisions obtained from said even and fine dividing can include the divisions obtained through said uneven dividing means.

5. The image processing apparatus according to claim 1, wherein the uneven dividing performed by said uneven dividing means is performed such as to match distribution as to how said given input color-image data is distributed in said input gamut.

6. The image processing apparatus according to claim 5, wherein said distribution is that as to which positions in said input gamut correspond to said given input color-image data.

7. The image processing apparatus according to claim 6, wherein:

said given input color-image data comprises a plurality of data units; and said distribution is that as to how many units of said data units correspond to a partial zone in said input gamut.

8. The image processing apparatus according to claim 6, wherein:

said given input color-image data comprises a plurality of data units; and said distribution is that as to how many different positions are present within a partial zone in said input gamut;

said different positions corresponding to said data units.

9. The image processing apparatus according to claim 5, wherein said uneven dividing is performed such that a partial zone of said input gamut is finely divided if said partial zone has a high distribution.

10. The image processing apparatus according to claim 6, wherein:

said image processing apparatus further comprises selecting means for selecting one of a first mode and a second mode;

said given input color-image data comprises a plurality of data units; and said distribution is either that as to how many units of said data units correspond to a partial zone in said input gamut if said first mode is selected or that as to how many different positions are present within a partial zone in said input gamut if said second mode is selected;

said different positions corresponding to said data units.

11. The image processing apparatus according to claim 1, further comprising:

part specifying means for specifying a part of an image which is represented by said given input color-image data; and data extracting means for extracting partial data from said given input color-image data, said partial data corresponding to said part specified through said part specifying means;

the uneven dividing performed by said uneven dividing means being performed such as to match distribution as to how said partial data is distributed in said input gamut.

12. The image processing apparatus according to claim 1, further comprising:

color specifying means for specifying colors which can be reproduced by an image forming apparatus which reproduces an image using said final output values; and the uneven dividing performed by said uneven dividing means being performed such as to match distribution as to how said colors specified through said color specifying means are distributed in said input gamut.

13. The image processing apparatus according to claim 12, further comprising color priority-order specifying means for specifying a color priority order of said colors specified through said color specifying means;

said uneven dividing being performed so as to use said colors specified through said color specifying means according to said color priority order specified through said color priority-order specifying means.

14. The image processing apparatus according to claim 13, further comprising dividing control means for controlling said uneven dividing so that said uneven dividing is stopped when a total number of divisions resulting from said uneven dividing reaches a predetermined value.

* * * * *